United States Patent
Langendorf et al.

(10) Patent No.: US 7,650,645 B1
(45) Date of Patent: Jan. 19, 2010

(54) TRUSTED BUS TRANSACTIONS

(75) Inventors: Brian Keith Langendorf, Benicia, CA (US); Michael Brian Cox, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 768 days.

(21) Appl. No.: 11/133,956

(22) Filed: May 20, 2005

Related U.S. Application Data

(60) Provisional application No. 60/573,224, filed on May 21, 2004.

(51) Int. Cl.
*G06F 1/26* (2006.01)
*G06F 21/00* (2006.01)
*G06F 7/04* (2006.01)

(52) U.S. Cl. .................. 726/27; 726/21; 726/31; 726/34; 713/182

(58) Field of Classification Search ............... 726/34, 726/21, 27, 31; 713/182
See application file for complete search history.

(56) References Cited

U.S. PATENT DOCUMENTS

| | | | | |
|---|---|---|---|---|
| 5,829,010 | A | * | 10/1998 | Cherabuddi ............ 711/100 |
| 6,775,779 | B1 | * | 8/2004 | England et al. ........... 726/26 |
| 7,269,747 | B2 | * | 9/2007 | Catherman et al. ....... 713/300 |
| 2005/0198542 | A1 | * | 9/2005 | Freker et al. ............ 713/320 |

* cited by examiner

*Primary Examiner*—Nasser G Moazzami
*Assistant Examiner*—Mohammad W Reza
(74) *Attorney, Agent, or Firm*—Townsend and Townsend and Crew LLP

(57) ABSTRACT

Circuits, methods, and apparatus that provide for trusted transactions between a device and system memory. In one exemplary embodiment of the present invention, a host processor asserts and de-asserts trust over a virtual wire. The device accesses certain data if the host processor provides a trusted instruction for it to do so. Once the device attempts to access this certain data, or perform a certain type of data access, a memory controller allows the access on the condition that the host processor previously made the trusted instruction. The device then accepts data if trust is asserted during the data transfer.

20 Claims, 10 Drawing Sheets

TRUSTED BUS TRANSACTIONS

This application is a continuation of U.S. provisional patent application No. 60/573,224, filed May 21, 2004, which is incorporated by reference.

BACKGROUND

The present invention relates to conducting trusted data transactions over a bus in an electronic system.

The concept of property has changed dramatically in the past several years. Once thought of as being limited to the physical, property has come to include the intangible, such as the highly organized collections of binary information that are our movies, music, and software. Just as the idea of property has changed, so has the idea of property theft. Since these movies, music, and software are just ones and zeros, if not properly protected, they can be stolen and reproduced with perfect accuracy.

Common places where this property can be found are computers, gaming, and other types of electronic systems. Property moves from circuit to circuit in these electronic systems over buses, such as PCIE, HyperTransport, AGP, and others. While on one of these buses, data may be vulnerable to theft. This threat may come in the form of hardware or software.

The hardware threat may come in the form of an add-in card, for example, an add-in card inserted in a PCI slot of a desktop computer. It may also come in the form of a plug in-card attached to the back of computer, or to a USB or Ethernet port. Software attacks can take many forms, among them software that deceives a host CPU by masking the true identity of a hardware device. In this way, an unauthorized device can hide from detection. Another type of software attack involves hijacking an authorized device in order to do the hijackers bidding.

Accordingly, it is desirable to provide secure transactions across a bus such that data transfers are not subject to theft. One way of doing this is to use encryption. But encryption requires encrypting data to be transferred and decrypting the data once it is received. This involves a great deal of computational overhead and complexity.

Thus, it is desirable to provide secure transactions across a bus without the requirement of encrypting the transferred data.

SUMMARY

Accordingly, embodiments of the present invention provide circuits, methods, and apparatus for conducting trusted transactions between two devices coupled by a bus. The two devices may be a host processor and graphics processing unit, a Northbridge and graphics processing unit or they may be other devices. In one exemplary embodiment of the present invention, a host processor asserts and de-asserts trust over a virtual wire using instructions sent over a bus. A graphics processor requests certain data from a system memory, or makes a certain type of data access, on the condition that the host processor makes a trusted instruction for it to do so. Once the graphics processor attempts to access the data, a memory controller, which may be located on the host processor, Northbridge, or other appropriate device, verifies whether the host processor previously sent the trusted instruction to the graphics processor. If so, the memory controller allows the graphics processor to access the data. The graphics processor reads the data if trust is once again asserted during the data transfer.

In various embodiments, memory access to certain restricted regions of the system memory are limited to trusted transactions, while other regions of system memory are accessible whether trust is asserted or not. In other embodiments, there may be various restricted regions, each requiring a different level or type of trust to be asserted.

In other embodiments, the type of memory access is limited by the level of trust asserted. For example, in some embodiments, a direct memory access is allowed only if it is trusted, while in other embodiments, direct memory access to certain restricted regions of system memory are allowed only if the request is trusted, while direct memory accesses to other regions of system memory are allowed whether or not trust is asserted. In other embodiments, other types of transactions or the performance of other types of instructions is conditioned on an assertion of trust.

In various embodiments, such as the examples shown below, the graphics processing unit is a single graphics processing unit, such as a graphics processing unit on an add-in card. In other embodiments, there may be multiple graphics processors. These one or more graphics processors may be located on the motherboard, or they may be integrated as part of the system chipset. In still other embodiments, the device may be one or more of another type of processor, such as a general purpose processor, or a processor of mixed specificity. For example, one or more of these processors may include video, audio, or other types of processors. In other embodiments, other types of devices may be used.

In a specific embodiment, the bus is a PCIE bus, though other types of buses, such as HyperTransport, PCI, AGP, and others, may be improved by incorporating embodiments of the present invention. In the future, other bus protocols will be developed that can be improved by the incorporation of embodiments of the present invention.

In the examples below, trust is asserted over a virtual wire by asserting trust in a first instruction or command, then de-asserting trust in a second instruction or command. Trusted transactions can then occur between two (or more) devices. In other embodiments, a physical wire can be used to assert trust. In other embodiments, trust can be asserted, then set to expire a set time later. Alternately, trust can be asserted in a flag, preamble, header, or other information associated with each packet of data transferred across the bus.

In various embodiments, hardware authentication can be used to improve the security of a bus. For example, a known device may have a specific private key. The host processor provides data to the device, such as a random number or character string, to be encrypted by the device. If the host can properly decrypt the result using a public key, the device is authenticated, if not, trusted transactions are not allowed with the device. Authentication may mean that trusted transactions are allowed with the device, or that trust does not need to be asserted for all or some of the transactions with the device. In some embodiments, data stored with the device, for example in an extended capabilities register, indicates whether the device supports hardware authentication. These extended capabilities registers may also store information regarding whether the device can support trusted transactions.

One exemplary embodiment of the present invention provides a method of performing a trusted access to a memory using a device. The method includes receiving an assertion of a level of trust over a bus, receiving a request over the bus, the request instructing the device to access the memory, providing a memory access request over the bus, upon verification that an instruction to request memory access was provided to the device, receiving data over the bus, and receiving a de-assertion of the level of trust over the bus.

Another exemplary embodiment of the present invention provides a method of conducting trusted data transfers over a bus connecting a first device to a second device. This method includes asserting a level of trust over the bus using the first device, providing an instruction over the bus to the second device, the instruction instructing the second device to request a transfer of data, providing a request for a transfer of data over the bus using the second device, receiving data over the bus using the second device, and de-asserting the level of trust over the bus using the first device.

Yet another exemplary embodiment of the present invention provides a method of transferring data from a system memory to a graphics processor in a secure manner. This method includes asserting a level of trust from a host processor to a graphics processing unit, sending an instruction from the host processor to the graphics unit, the instruction instructing the graphics processing unit to request a data access, storing information regarding the instruction, sending a request from the graphics processor to the host processor requesting data, verifying that the request from the graphics processor corresponds to the instruction from the host processor by using the stored information, transferring data from a system memory to the graphics processor, and de-asserting the level of trust from the host processor to the graphics unit.

A better understanding of the nature and advantages of the present invention may be gained with reference to the following detailed description and the accompanying drawings.

DESCRIPTION OF EXEMPLARY EMBODIMENTS

Figure 1:
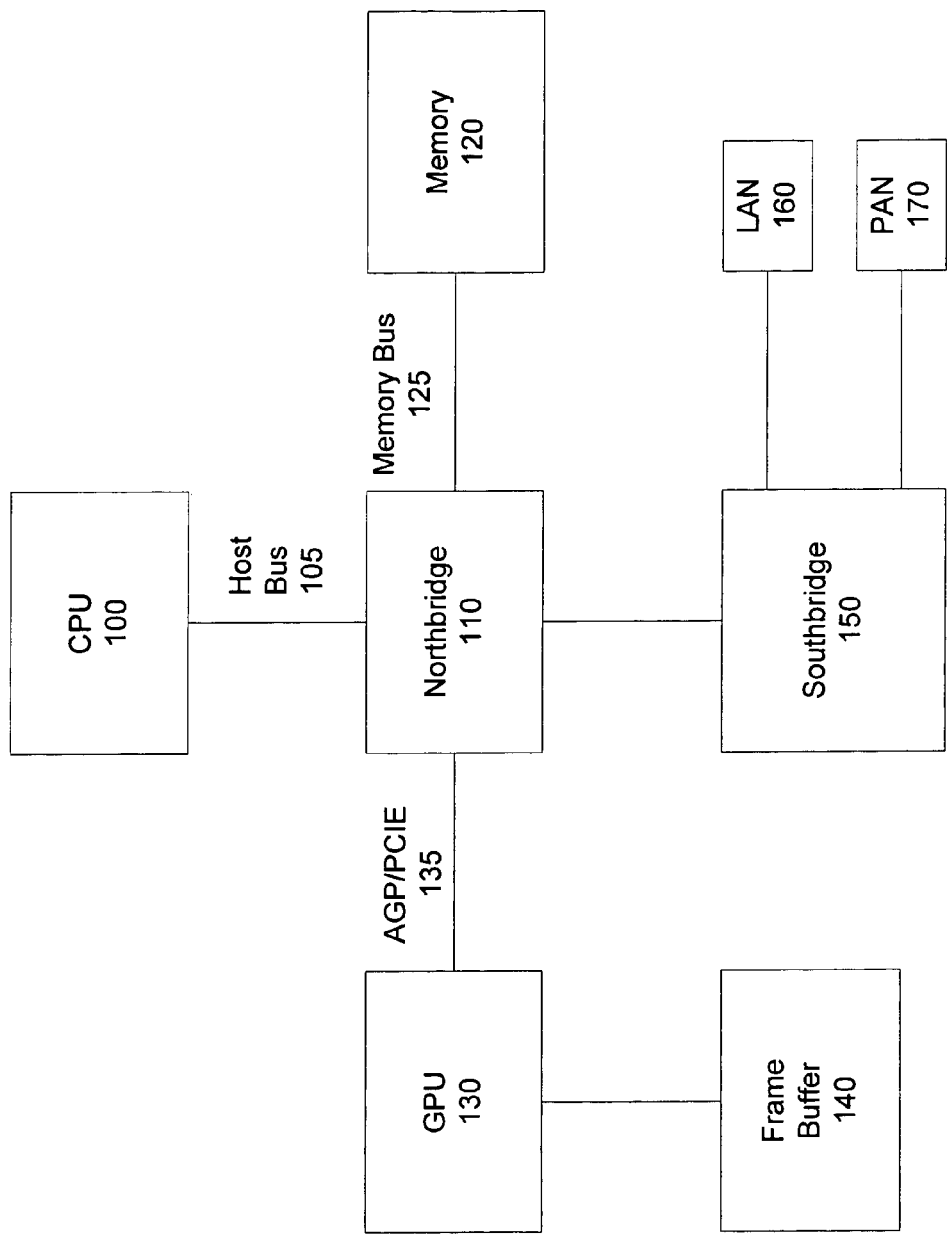
FIG. 1 is a block diagram of a computing system that is improved by incorporating an embodiment of the present invention.

FIG. 1 is a block diagram of a computing system that is improved by incorporating an embodiment of the present invention. This block diagram includes a central processing unit (CPU) or host processor 100, Northbridge 110, system memory 120, graphics processing unit (GPU) 130, frame buffer or graphics memory 140, Southbridge 150, and local area network (LAN) 160 and personal area network (PAN) devices 170. The CPU 100 connects to the Northbridge 110 over the host bus 105. The Northbridge 110 is in communication with the graphics processing unit 130 over the advanced graphics port (AGP) or peripheral component interconnect express (PCIE) bus 135. The Northbridge 110 reads and writes data to and from the system memory 120 over the memory bus 125. A memory controller (not shown) resides on Northbridge 110 and controls access to the system memory 120.

The CPU 100 may be a processor, such as those manufactured by Intel Corporation or Advanced Micro Devices, and are well-known by those skilled in the art. The Northbridge 110 and Southbridge 150 are commonly referred to as a chipset. The memory 120 is often a number of dynamic random access memory devices arranged in a number of the dual in-line memory modules (DIMMs). The Southbridge 150 connects local area network devices 160 and personal area network devices 170 to the remainder of the computer system, as well as hard disk drives, optical drives, printers, and other peripheral devices (not shown). The graphics processing unit 130 receives data over the AGP or PCIE bus 135 and generates graphic and video images for display over a monitor or other display device (not shown). The graphics processing unit 130 may make use of a frame buffer or graphics memory 140 as well as the system memory 120. The graphics processing unit 130 may be a graphics processing unit manufactured by NVIDIA Corporation of Santa Clara, Calif.

The host bus 105, over which the CPU 100 communicates with the Northbridge 110, and the memory bus 125, over which the Northbridge 110 communicates with the system memory 120, are currently considered to be secure connections. That is, they are not publicly accessible buses. Conversely, the AGP or PCIE bus 135, over which the CPU communicates with the Northbridge 110, is currently considered by some to be a publicly accessible bus. As such, the status of the security of this bus is undetermined at this time. Accordingly, it is desirable to provide for secure transactions across this bus.

Security concerns are as follows: the Southbridge 150 reads data from a drive or other source, such as an optical drive (not shown). For example, this optical drive may be a DVD player. Data or property is often protected at this stage by encryption or encoding or some proprietary method. The data or property is passed through to the Northbridge 110 and stored in the system memory 120. The GPU 130 retrieves this data, and uses it to generate an image for display on the monitor. As data is needed by the GPU 130, it is read and from the memory 120 by the GPU 130 via the Northbridge 110. The data on the AGP or PCIE bus 135 is shorn of its encryption or other security features. Since the security of the AGP or PCIE bus 135 is indeterminate, there is concern that the property on the DVD may be stolen at this point. Accordingly, embodiments of the present invention provide for secured transfers of data across this bus. In other embodiments, data transfers across other buses in this or other architectures may be protected.

Figure 2:
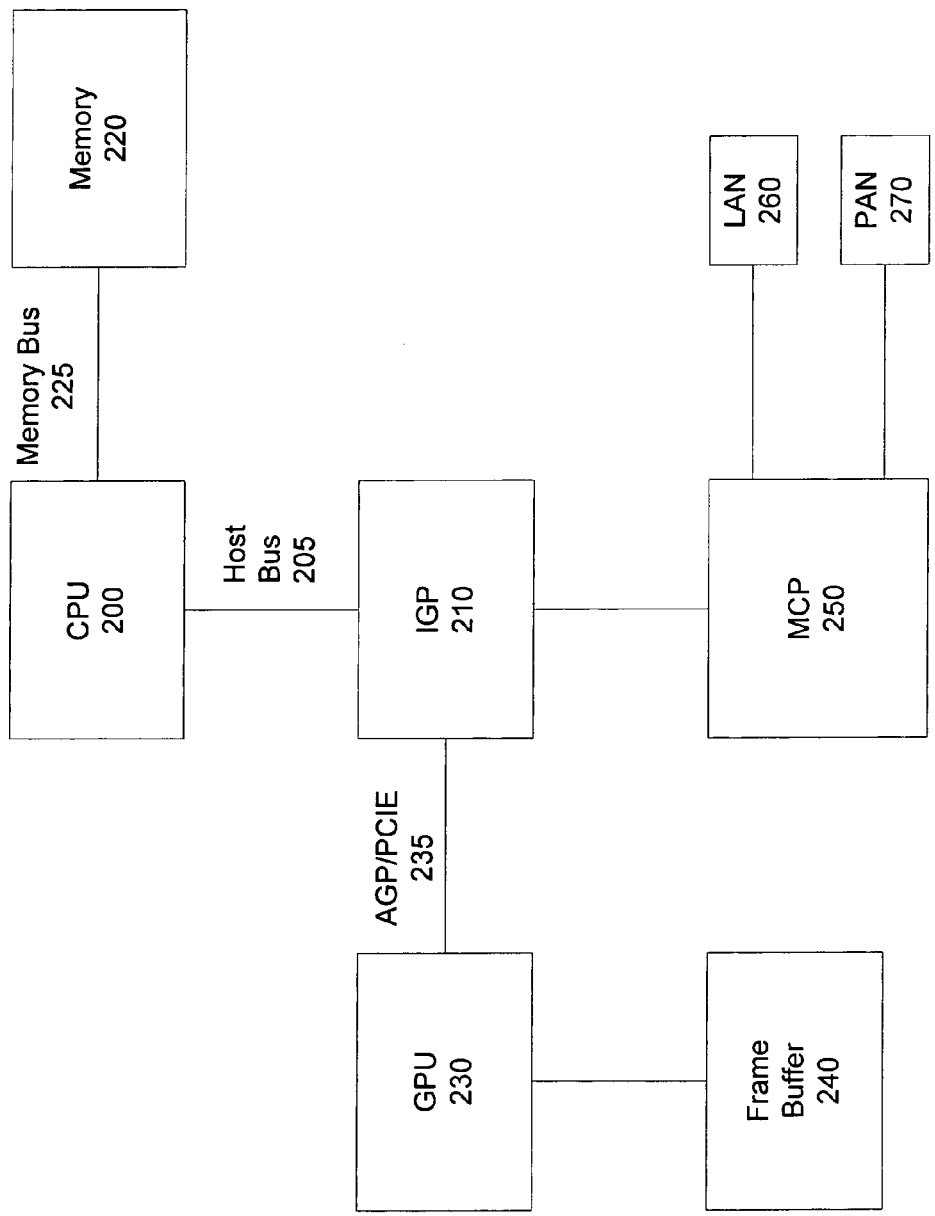
FIG. 2 is a block diagram of another computing system that is improved by incorporating an embodiment of the present invention.

FIG. 2 is a block diagram of another computing system that is improved by incorporating an embodiment of the present invention. This block diagram includes a central processing unit or host processor 200, an integrated graphics processor (IGP) 210, system memory 220, graphics processing unit 230, frame buffer or graphics memory 240, media and communications processor (MCP) 250, and local area network devices 260 and personal area network devices 270.

Again, the central processing unit or host processor 200 may be one of the central processing units manufactured by Intel Corporation or Advanced Micro Devices, and are well-known by those skilled in the art. The integrated graphics processor 210 and media and communications processor 240 may be a chipset provided by NVIDIA Corporation of Santa Clara, Calif. The graphics processing unit 230 is an optional graphics processing unit that may be used instead of or along with the integrated graphics processing circuitry that is included on the integrated graphics processor 210.

The CPU 200 communicates with the IGP 210 via the host bus 205. A memory controller (not shown) resides on the CPU 200 and controls access to the system memory 220 over the memory bus 225. As before, the host bus 205 and memory bus 225 are considered to be secured connections, while the status of the AGP or PCIE bus 235 is somewhat undetermined at this time. Accordingly, it is desirable to provide for secure dated transfers across this bus.

There is a concern, though it is not established at this point, that the AGP or PCIE bus 235 is vulnerable to attack. For example, the GPU 230 and frame buffer or graphics memory 240 often reside on an add-in card that is inserted into a PCI slot on the motherboard of the computer. If a card with nefarious motives is inserted into a PCI slot, the data on bus 235 may be stolen or surreptitiously written to another media device or memory. Alternatively, a device may be attached to a PCI or other connection at the back of a computer, such that data is stolen at that point. Also, a device connected to this circuitry over a network may spoof (pretend to be) the GPU 230 and access and steal data in that matter. Alternately, the CPU 230 may be hijacked and instructed to perform commands by a nefarious network device.

Thus, it is important that the CPU only provide system memory 220 accesses to the right devices in order to help prevent property theft. Accordingly, embodiments of the present invention provide for secure data transaction across a bus, for example the AGP or PCIE bus 235 in FIG. 2.

Figure 3A:
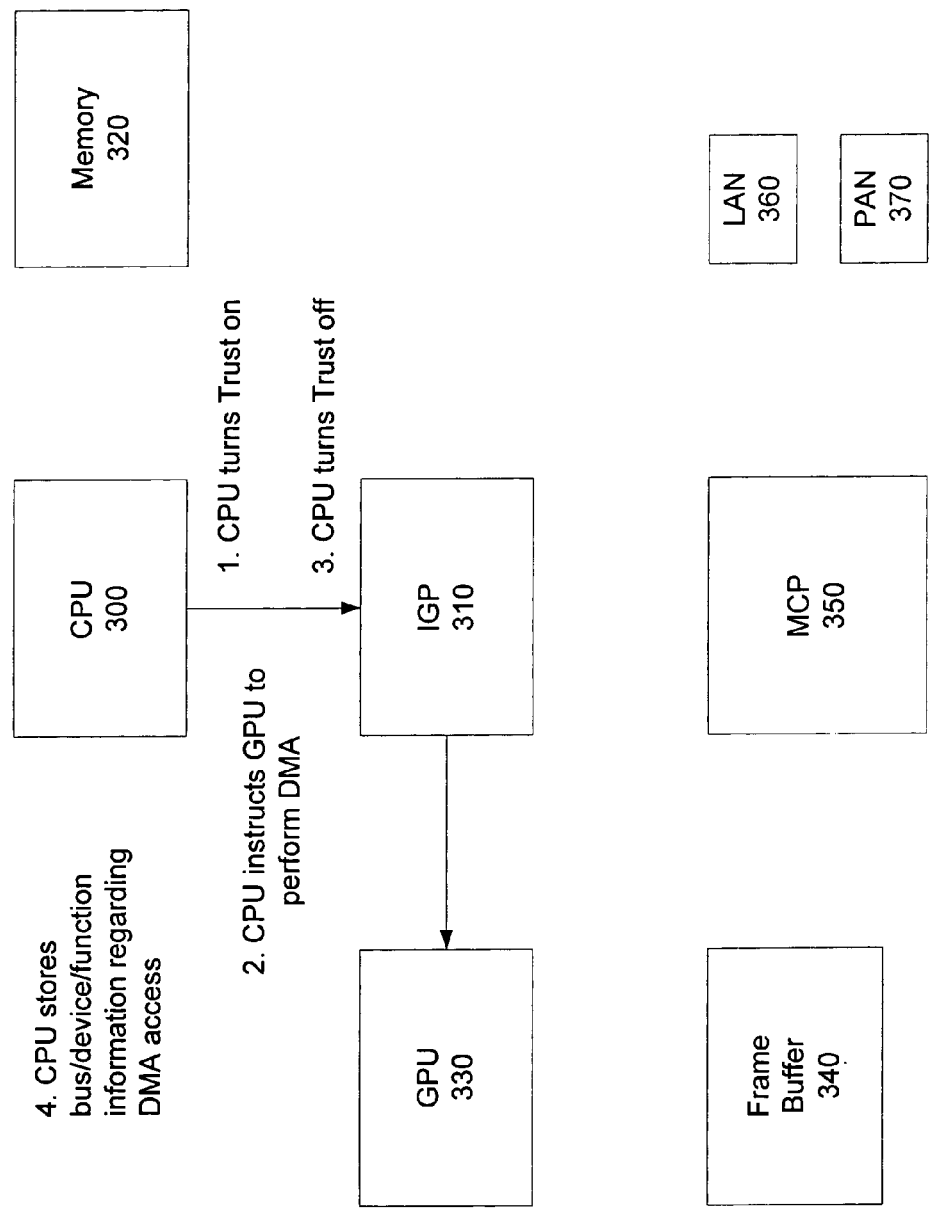
FIGS. 3A-3D show the data flow in the block diagram of FIG. 2 for an embodiment of the present invention.

FIGS. 3A-3D illustrate the data flow in the block diagram of FIG. 2 for an embodiment of the present invention. In FIG. 3A, the central processing unit 300 determines that the graphics processing unit 330 needs to access data from the system memory 320. This access may be to a restricted region of the system memory 320, or the access may be a restricted type of access. The CPU determines that this access needs to be a trusted access, and accordingly, the CPU 300 sets the state of a virtual wire such that following instructions are designated as trusted instructions. This may be done by sending an instruction from the CPU 300 to the GPU 330 via the IGP 310. That is, this virtual wire can be a state, which is a set by the receipt of an instruction from the CPU 300. It may alternately be a physical wire carrying a signal. In other embodiments, the trust state is carried as a flag or part of a preamble or header that is included in instructions and data packets that are transferred across the bus.

The CPU 300 instructs the GPU 330 to access data from the system memory 320. In this particular example, the CPU instructs the GPU to perform a direct memory access. At this point, the CPU may turn trust off, that is, it may change the state on the virtual wire back to the previous condition. In other embodiments, trust may stay active for a certain amount of time, or for a certain number of transactions before automatically resetting.

The CPU 300 stores information regarding details of the instruction it sent to the GPU 330. In a specific embodiment, information regarding the bus that the GPU 330 resides on, the identity of the GPU, and the function that was requested are stored, for instance in a table. In general, when the CPU 300 sends a trusted instruction to a device, the CPU 300 stores the identity of the bus that the device resides on, the identity of the device, and the function that the CPU is instructing in a table which may be referred to as a bus-device-function log.

Figure 3B:
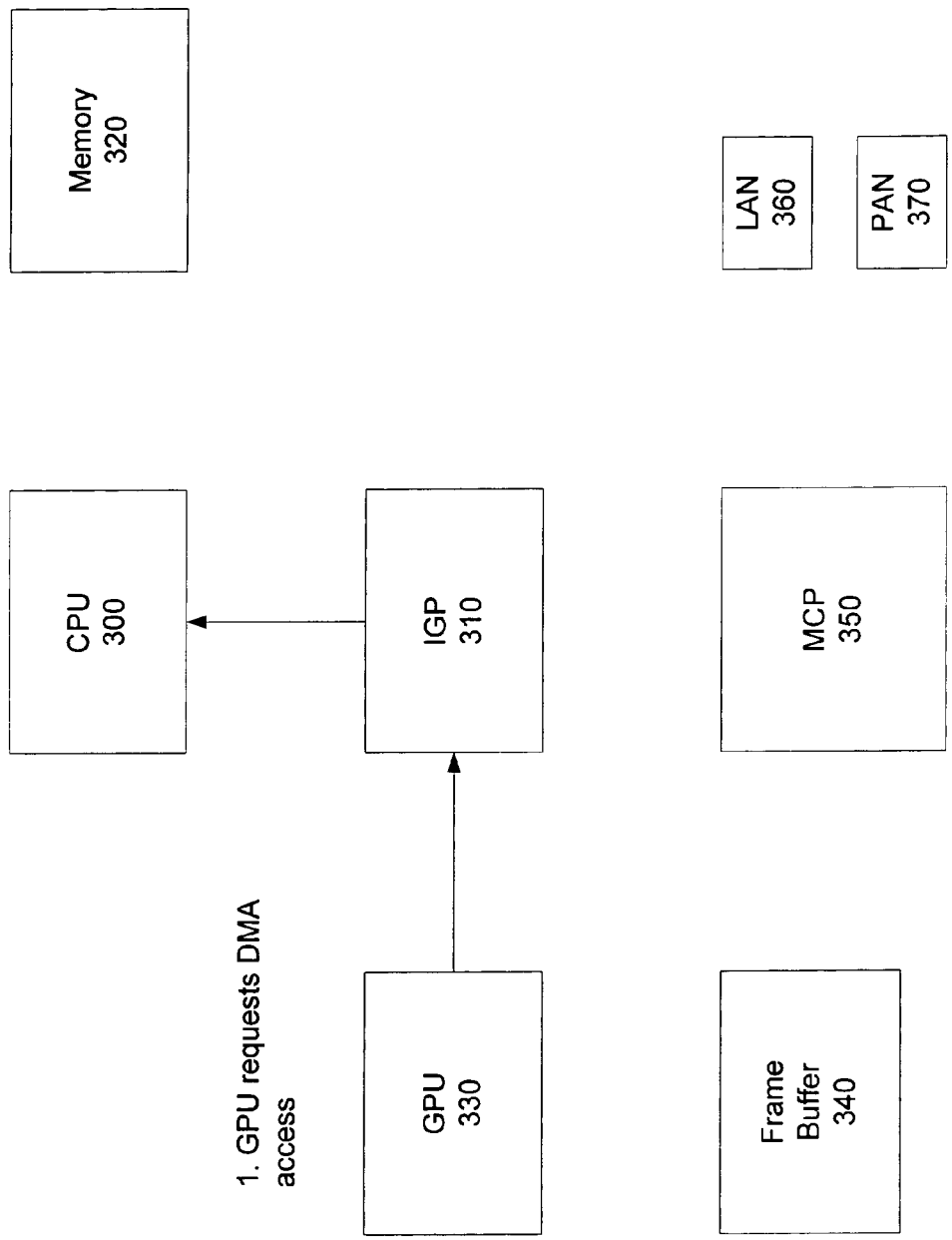

In FIG. 3B, the GPU 330 requests a direct memory access as instructed by the CPU 300. Specifically, the GPU 330 sends a request to the CPU 300 requesting access to the system memory 320. In other embodiments, the GPU 330 also has the ability to turn trust on and off, and does so before and after the request for memory access. In a specific embodiment of the present invention, if the instruction from the CPU 300 is not identified as a trusted instruction, the GPU 330 is not to make the request as instructed. In other embodiments, the GPU 330 may make a request if the instruction from the CPU 300 is not trusted, but the GPU 330 is not to make a request to a restricted region of the system memory 320.

Figure 3C:
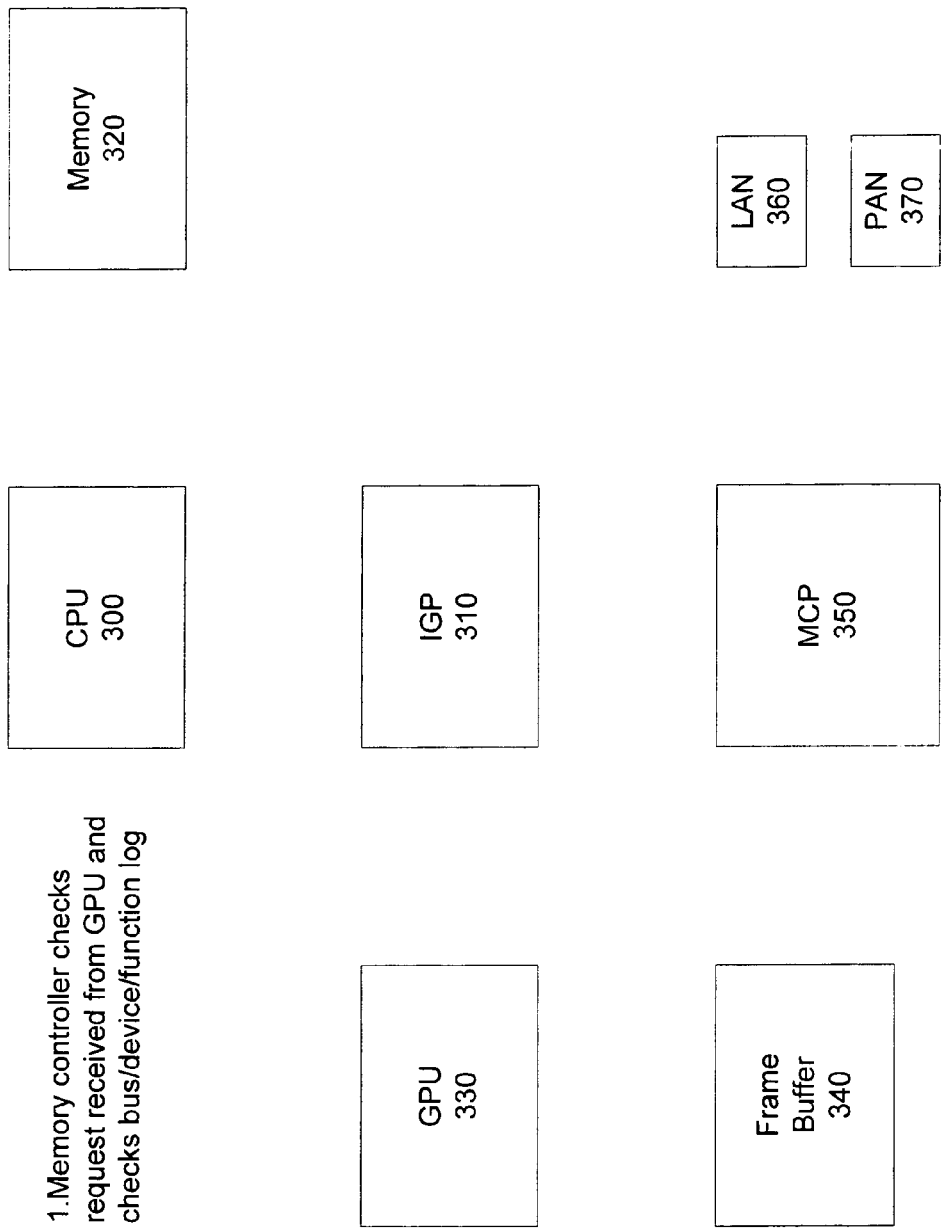

In FIG. 3C, a memory controller located in the CPU 300 checks the requests received from the GPU 330 and compares it to its bus-device-function log or table. If the memory controller confirms that the GPU 330 is making a request as instructed, the GPU 330 is allowed access to the system memory 320. If the GPU 330 requests memory access on its own, the memory access to the restricted regions of the system memory 320 is denied. In other embodiments, if the request from the GPU 330 is in response to an instruction from the CPU 300, but trust was not asserted by the CPU 300, access to non-restricted regions of the memory 320 is granted, while access to restricted regions of the system memory 320 is denied.

Figure 3D:
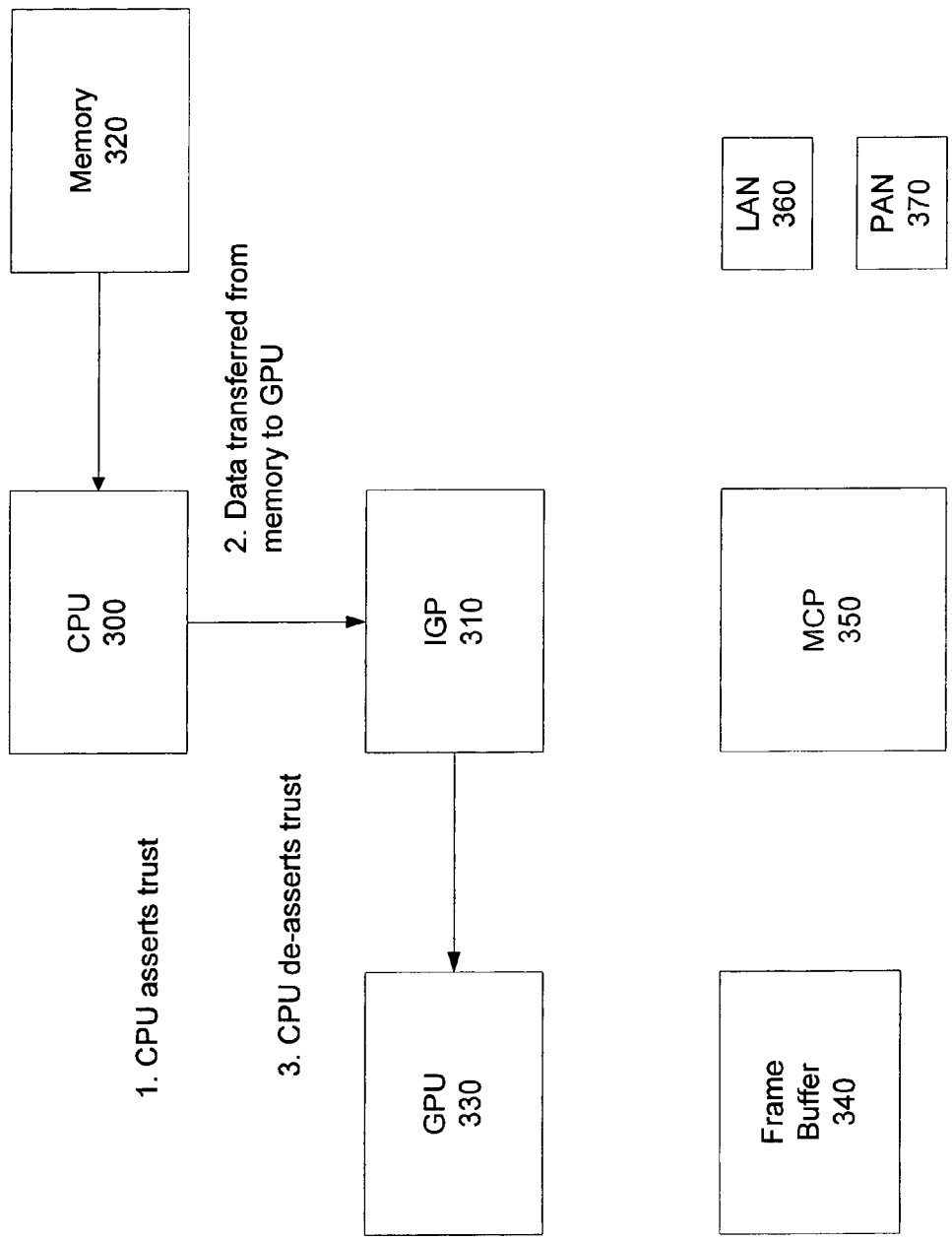

In FIG. 3D, the CPU reasserts trust, by sending an instruction, setting a flag, or other means. The data is requested from the memory 320 by the CPU 300 and transferred to the GPU 330 via the AGP or PCIE bus 335. Once the data transfer is complete, the CPU 300 may de-assert trust.

In this example, trusted transactions occur between a CPU 300 and GPU 330 in a computer architecture as shown in FIG. 2. A similar data flow in the computer architecture shown in FIG. 1 is also possible utilizing an embodiment of the present invention. Similar data flows in game consuls and other types of systems are possible utilizing embodiments of the present invention. In other embodiments, the transactions may occur between these or other circuits. Further, other types of system buses may be protected by embodiments of the present invention. For example, industry standard architecture (ISA) buses, integrated drive electronics (IDE), peripheral component interconnect (PCI), and other types of buses may be protected. Various architectures may be improved by embodiments of the present invention, the included FIGS. 1 and 2 illustrate only two of many possibilities. Again, others include gaming devices, consumer electronic products, and other electronic systems.

Also in these examples, trust is used to protect data stored in memory from unauthorized access. In other embodiments of the present invention, other types of data access are protected. For example, access to optical or hard drives may be protected. Alternately, access to other types of devices such as printers or web cameras may be protected.

A GPU (or other device) may make a memory access request in response to a trusted instruction, in response to an instruction without trust being asserted, or on its own initiative. Various embodiments of the present invention may respond differently to these different requests.

A request in response to a trusted instruction is granted access to restricted and non-restricted memory regions, in a typical embodiment of the present invention. A request in response to an instruction without trust asserted is typically limited to non-restricted memory regions. A memory access by a GPU or other device made on the device's own initiative is either ignored or limited to non-restricted memory regions.

Again, various levels or types of trust may be used. For example, there may be a restricted region 1, restricted region 2, and non-restricted region 3. Where various levels of trust are used, a request having the highest level of trust is allowed access to all three regions, a general trusted request is allowed access to regions 2 and 3, while a request without trust being asserted is limited to the non-restricted region 3. Where various types of trust are used, a request having a first type of trust is allowed access to regions 1 and 3, a request having a second type of trust is allowed access to regions 2 and 3, while a request without trust being asserted is limited to the non-restricted region 3, as before. One skilled in the art will appreciate that other numbers of regions, combinations of types and levels of trust, and other factors may be used by embodiments of the present invention.

Figure 4:
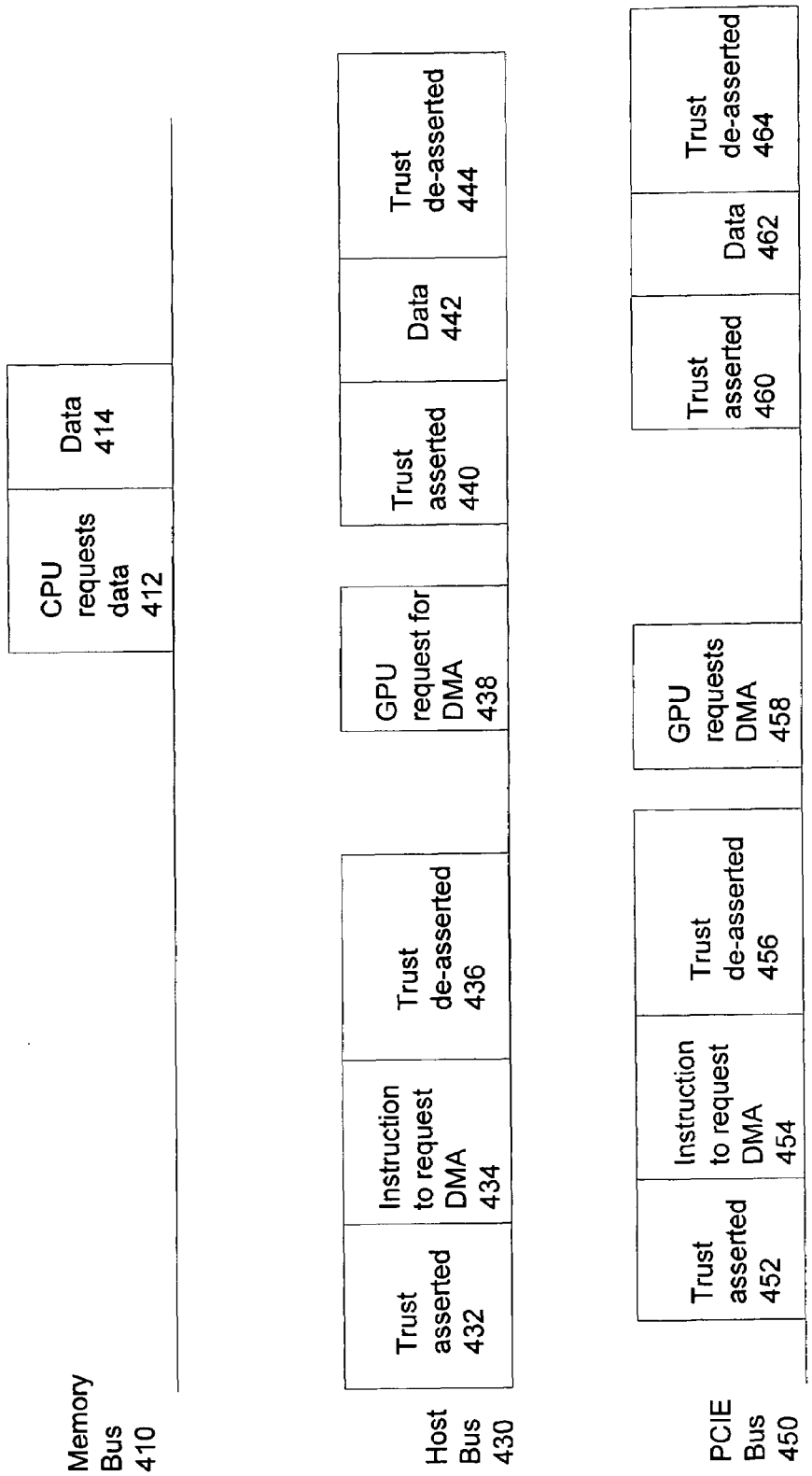
FIG. 4 is a timing diagram showing activity on various computer system buses according to an embodiment of the present invention.

FIG. 4 is a timing diagram showing the activity on various computer system buses according to an embodiment of the present invention. This figure includes the activity on a memory bus 410, host bus 430, and PCIE bus 450. These buses may be buses in computer systems of the types shown or similar to those in FIGS. 1 and 2, or they may be buses in other computer, gaming, or other electronic systems. Initially, trust 432 is asserted over the host bus 430. This instruction or command 452 is passed over the PCI bus 450. An instruction 434 to request memory access is provided across the host bus 430 and as instruction 454 over the PCIE bus 450. The trust 436 and 456 is de-asserted across the same buses.

The GPU requests a memory access 458 over the PCIE bus 450. The request 438 is passed to the host bus 430. A memory controller checks that the request received 438 corresponds to the instruction provided 434. If it does, the memory controller requests data 412 over the memory bus 410. The memory bus 410 provides data 414 across the memory bus 410 to the memory controller.

Trust 440 is re-asserted 440 over the host bus 430 and PCIE bus 450. Data is transferred across the host bus 430 and PCIE bus 450. Once the data transfer is complete, trust 444 may be de-asserted across the host bus 430 and the PCIE bus 450.

Figure 5:
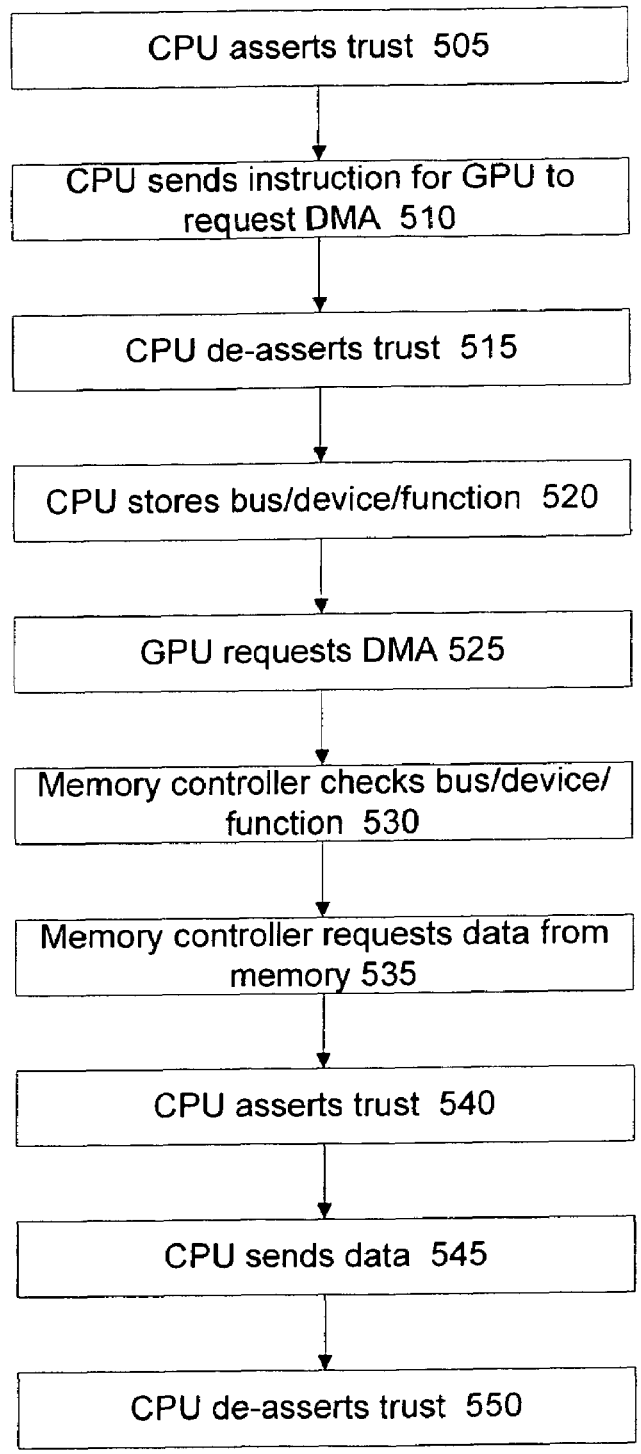
FIG. 5 is a flow chart showing a trusted data transfer according to an embodiment of the present invention.

FIG. 5 is a flow chart showing a trusted data transfer according to an embodiment of the present invention. In act 505, the CPU asserts trust. The CPU sends a trusted instruction instructing the GPU to request a system memory access in act 510. The CPU then optionally de-asserts trust in act 505. The CPU also stores information regarding the bus, device, and function for the instruction sent in act 510.

In act 515, the GPU requests a direct memory access to a restricted region of the system memory. A memory controller checks this request against a bus-device-function table entry in act 530. If there is a match, the memory controller requests data from the memory in act 535. The CPU re-asserts trust in act 540, sends the data in act 545. Once the data transfer is complete, in act 550, the CPU de-asserts trust.

In addition to securing each individual transaction, a bus may be further secured by ensuring that the device, a GPU in these examples but other circuits in other implementations, is a device that should or can be trusted. One way to do this is through a hardware authentication scheme.

Figure 6:
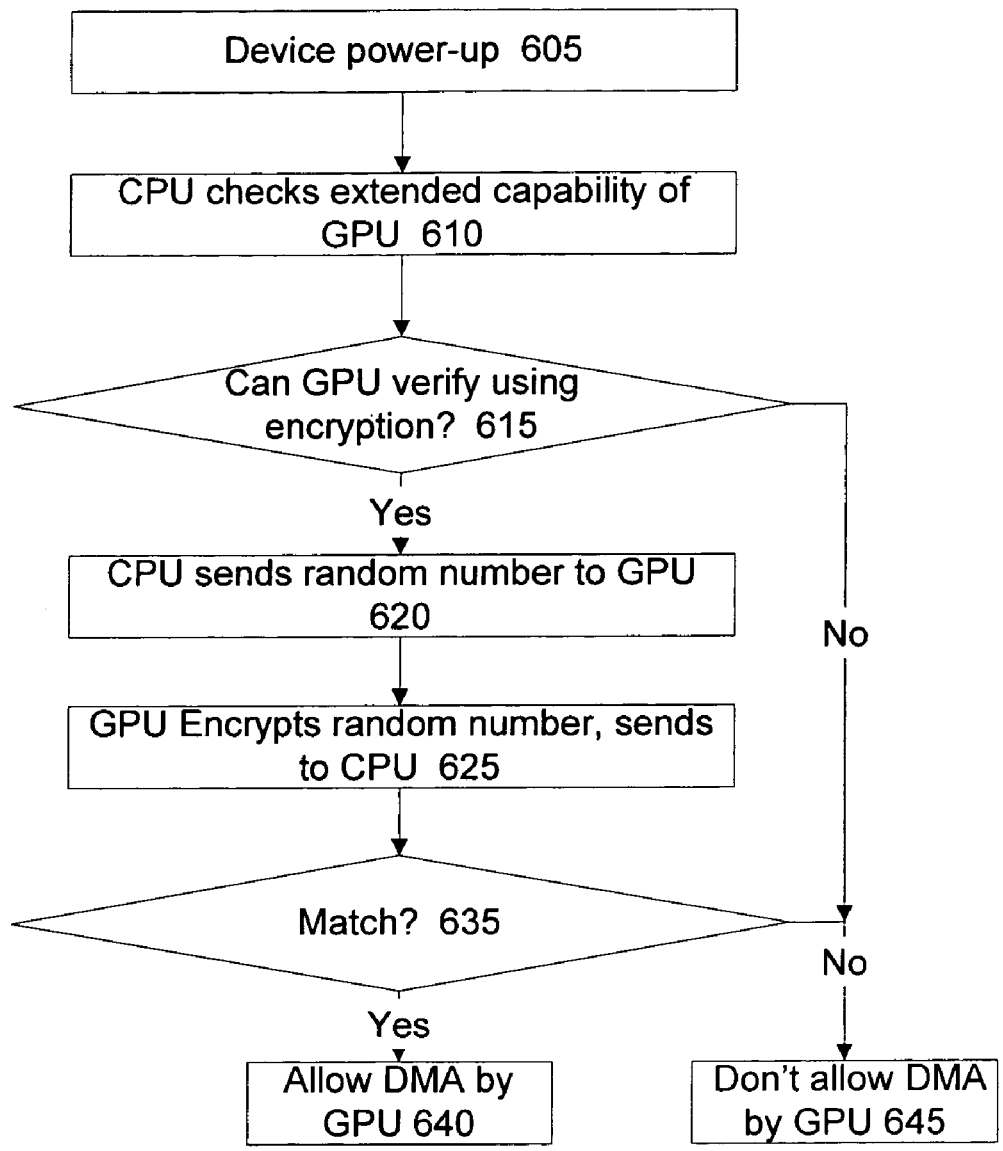
FIG. 6 is a flow chart showing a method of hardware authentication that may be used by an embodiment of the present invention.

FIG. 6 is a flow chart showing a method of hardware authentication that may be used by an embodiment of the present invention. This hardware authentication adds another level of security by ensuring that a device that identifies itself as a particular trusted device is in fact such a device.

The hardware authentication can be performed in several ways. In this particular example, the authentication begins at device power-up or other appropriate time 605. In act 610, the CPU checks the extended capability registers on the GPU. These registers are circuits on devices such as graphics processing units that store information regarding device type, manufacture, model, and the capabilities of the device. In act 615, it is determined whether the GPU can verify its authenticity. If it cannot, specific types of memory access, such as direct memory access, or access to specific memory locations, is not allowed by the CPU in act 645.

If the device can authenticate itself, the CPU sends a random number (or character string or other sequence of bits) to the device in act 620. The device encrypts the random number using its private key and sends the encrypted random number to the CPU in act 625. In act 635, the CPU decrypts the encrypted random number using a public key and determines whether there is a match between the decrypted random number and the random number sent to the device. If there is a match, direct memory access by the GPU is allowed by the CPU in act 640. If there is not a match, memory access by the GPU is not allowed in act 645.

Figure 7:
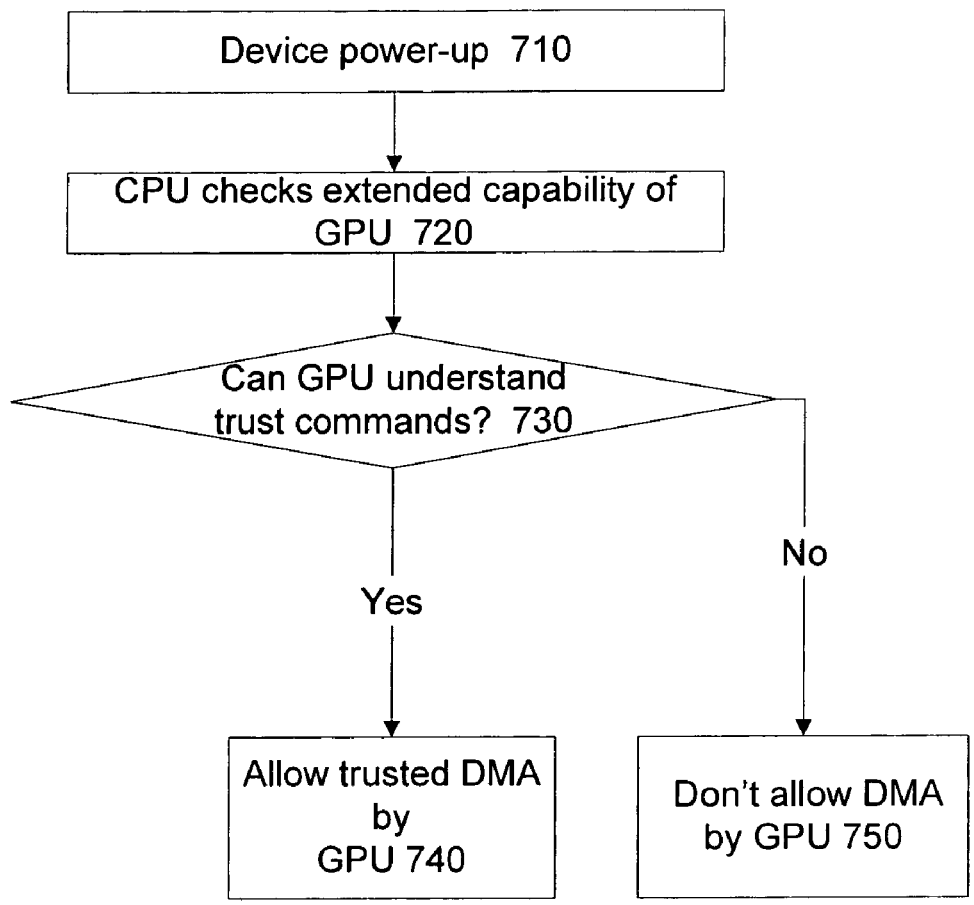
FIG. 7 is a flow chart showing another method of hardware authentication that may be used by an embodiment of the present invention.

FIG. 7 is a flow chart showing another method of hardware authentication that may be used by an embodiment of the present invention. Again, this authentication can begin at device power-up or other appropriate time 710. The CPU checks the extended capability registers on the graphics processing unit in act 720. In act 730, the CPU determines whether the GPU is capable of properly understanding and processing trusted commands. If it can, then trusted memory accesses are allowed by the CPU. If the device cannot properly processed trust commands, specific types of memory access, or access to specific memory locations, is not allowed by the CPU. For example, direct memory access may not be allowed by the CPU.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of performing a trusted access to a memory using a device comprising:
   receiving a random number over a bus;
   providing an authentication for the device by encrypting the random number and providing the encrypted random number over the bus, the authentication for the device provided to receive an assertion of a level of trust;
   receiving the assertion of a level of trust over the bus;
   receiving an instruction over the bus, the instruction instructing the device to access the memory;
   providing a memory access request over the bus;
   upon verification that an instruction to request memory access was provided to the device;
   receiving data over the bus; and
   receiving a de-assertion of the level of trust over the bus.

2. The method of claim 1 further comprising:
   receiving a de-assertion of the level of trust following the receiving of the instruction.

3. The method of claim 2 further comprising:
   receiving a re-assertion of the level of trust before receiving data over the bus.

4. The method of claim 1 wherein the memory access is a direct memory access.

5. The method of claim 1 wherein the device is a graphics processor.

6. The method of claim 1 wherein the bus is a PCIE bus.

7. The method of claim 1 wherein the verification that an instruction to request memory access was provided to the device is performed by a host processor.

8. A method of conducting trusted data transfers over a bus connecting a first device to a second device, the method comprising:

providing a character string over the bus using the first device;

providing the encrypted character string over the bus using the second device;

in response to receiving the encrypted character string, authenticating the second device and asserting a level of trust over the bus using the first device;

providing an instruction over the bus to the second device, the instruction instructing the second device to request a transfer of data;

providing a request for a transfer of data over the bus using the second device;

receiving data over the bus using the second device; and de-asserting the level of trust over the bus using the first device.

9. The method of claim 8 wherein the bus is a PCIE bus.

10. The method of claim 8 wherein the first device is a host processor and the second device is a graphics processor.

11. The method of claim 10 wherein the data is transferred from a system memory.

12. The method of claim 10 wherein the request for a transfer of data is a request for a direct memory access.

13. The method of claim 8 wherein before the level of trust is asserted over the bus, reading a register on the second device using the first device to determine whether the second device is configured to process an assertion of the level of trust.

14. The method of claim 8 wherein the level of trust is asserted by sending an instruction.

15. The method of claim 8 wherein the character string is a random number.

16. A method of transferring data from a system memory to a graphics processing unit in a secure manner comprising:

sending a character string from the host processor to the graphics processing unit;

encrypting the character string using the graphics processing unit and sending the encrypted character string from the graphics processing unit to the host processor;

in response to receiving the encrypted character string, authenticating the graphics processing unit and asserting a level of trust from the host processor to the graphics processing unit;

sending an instruction from the host processor to the graphics processing unit, the instruction instructing the graphics processing unit to request a data access;

storing information regarding the instruction;

sending a request from the graphics processing unit to the host processor requesting data;

verifying that the request from the graphics processing unit corresponds to the instruction from the host processor by using the stored information;

transferring data from a system memory to the graphics processing unit; and de-asserting the level of trust from the host processor to the graphics processing unit.

17. The method of claim 16 wherein sending a character string from the host processor to the graphics processing unit comprises:

sending a random number from the host processor to the graphics processing unit.

18. The method of claim 16 further comprising:

before asserting a level of trust from a host processor to a graphics processing unit, reading a register on the graphics processing unit to determine whether the graphics processing unit is configured to process an assertion of a level of trust.

19. The method of claim 16 wherein the graphics processing unit is permitted access a first plurality of memory addresses in the system memory when trust is asserted, but not permitted to access a second plurality of memory addresses in the system memory when trust is asserted.

20. The method of claim 16 wherein the graphics processing unit is not permitted to access a first plurality of memory locations in the system memory unless trust is asserted.

* * * * *